3,730,874
TUBULAR-SHAPED OZONIZER POSSESSING COOLED INNER ELECTRODE
Hannes Trüb, 95 Hoschgasse, 8008 Zurich, Switzerland
Filed Nov. 22, 1971, Ser. No. 200,701
Claims priority, application Switzerland, Dec. 1, 1970, 17,798/70
Int. Cl. C01b 13/12
U.S. Cl. 204—321
8 Claims

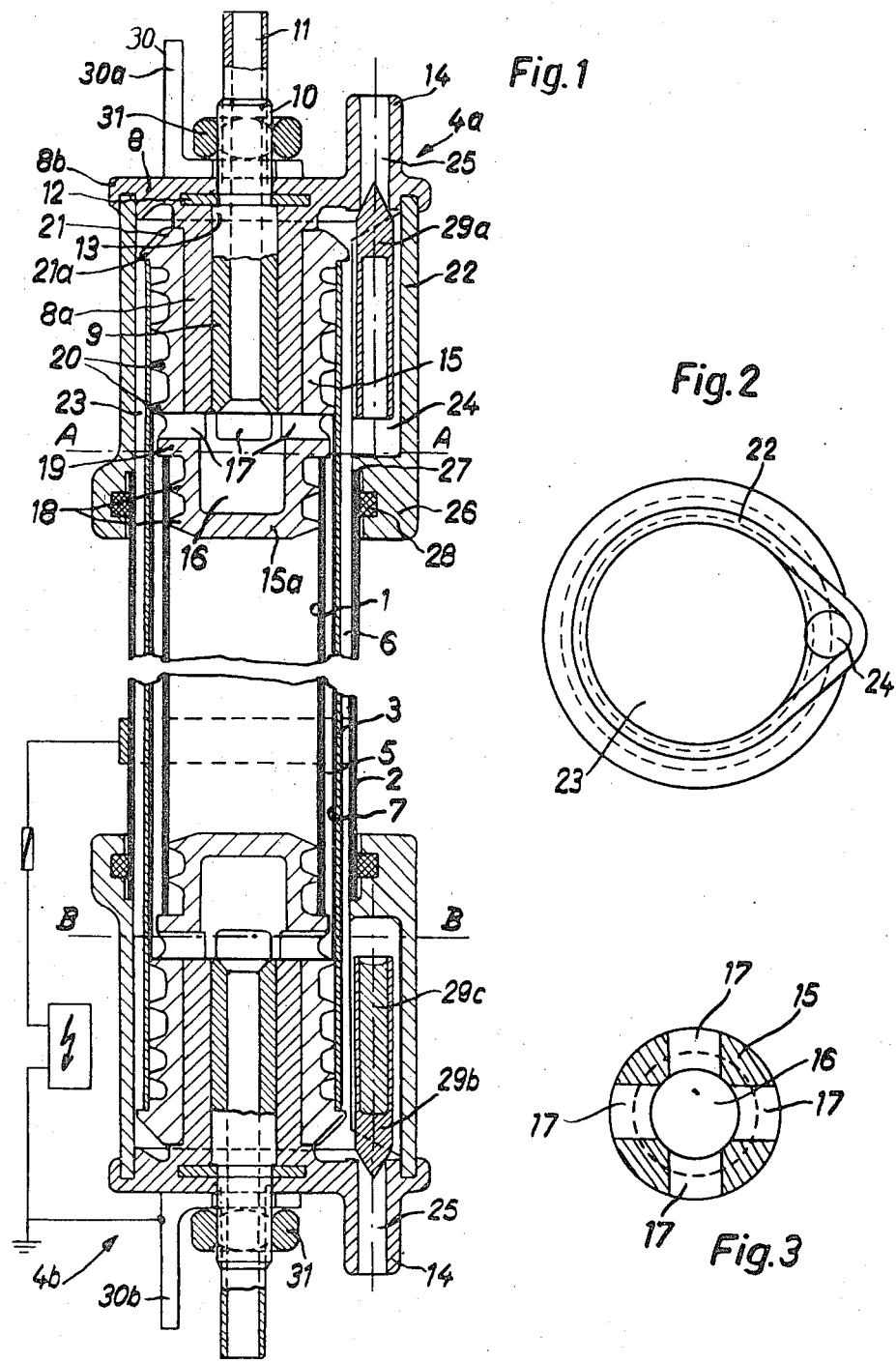

ABSTRACT OF THE DISCLOSURE

A tubular-shaped ozonizer of the type equipped with a cooled inner electrode and a dielectric tube concentrically arranged between the inner electrode and an outer electrode. The tubular-shaped inner and outer electrodes and the dielectric electrode are held and maintained in spaced relationship from one another by electrically insulating closure cap members mounted at their ends. According to the invention, the space between the inner electrode and the outer electrode which is of substantially circular-shaped cross-sectional configuration is subdivided by the dielectric tube into an outer discharge compartment and an inner cooling compartment. The discharge compartment and cooling compartment communicate by means of spaced hollow compartments of the closure caps with conduit connections provided at such closure caps for supplying the discharge compartment with air and the cooling compartment with a cooling fluid medium.

BACKGROUND OF THE INVENTION

The present invention relates to a new and improved substantially tubular-shaped ozonizer equipped with a cooled inner electrode and a dielectric tube concentrically arranged between the inner electrode and an outer electrode, the tubular-shaped electrodes and the dielectric tube being supported and mounted in spaced relationship from one another by electrically insulating closure caps mounted at their ends.

In order to obtain good operational efficiencies with a tubular-shaped ozonizer driven at high-operating voltages and at high-frequencies, it is necessary to cool at least the inner electrode. Hence, the inner electrode is usually constructed in the form of a hollow metallic cylinder and both ends of the hollow cylinder are provided with a respective connection element for connecting the infeed conduit and outfeed conduit for the cooling agent.

A state-of-the-art construction of ozonizer equipped with cooled inner electrode and outer electrode utilizes, for instance, as the inner electrode a metallic hollow cylinder, at the ends of which there are mounted tubular pieces of smaller diameter. A metallic hollow body member possessing a substantially circular-shaped cross-sectional configuration functions as the outer electrode and is longer than the hollow cylinder of the inner electrode, thus protrudes past both of its ends. Two glass tubes, one of which is situated at the inner wall of the hollow body member defining the outer electrode and the other of which is situated at the outer wall of the hollow cylinder defining the inner electrode serve to delimit the discharge compartment between both electrodes. The inner electrode and both glass tubes are supported and spaced from one another by means of electrically insulating cap members which are secured to the ends of the hollow body member. A hollow space or compartment is formed within each cap member into which opens a conduit connection, and the inner glass tube is provided at both ends with openings so that air can be delivered to the discharge compartment through the agency of one of the conduit connections and the ozonized air can be withdrawn through the other conduit connection. Since during operation the intensity of the electrical field is great at the edges of the hollow cylinder of the inner electrode, the danger exists that the glass tubes will puncture at these locations. In order to prevent this, the region of the inner wall of the hollow body member of the outer electrode which is situated opposite the aforementioned edges is outwardly flexed in a trough-like fashion. The fabrication of such type ozonizer is rather complicated and expensive, even if the outer electrode is formed as a tube and is not cooled by a coolant or cooling agent.

According to a more simplified prior art construction of tubular-shaped ozonizer the inner and outer electrodes consisting of metallic tubes are supported and spaced from one another in pot-shaped plastic closure caps. Each closure cap possesses a hub at which there is mounted a hollow shaft equipped with a sealing-pressure piston at its inner end. The inner electrode is supported at its ends by the pressure pistons. The coolant or cooling fluid medium can be infed and withdrawn through the hollow shaft. A dielectric tube is usually provided at the discharge compartment between the inner electrode and the outer electrode, this dielectric tube being longer than both electrode tubes and protruding past such at both ends thereof. In this construction the dielectric tube is retained at the closure caps in such a way that the infed air can uniformly flow through the partial spaces of the discharge compartment between the electrodes and the dielectric tube. The tubes of such ozonizers can exceed 1 meter in length, and the diameter of the inner electrode generally only amounts to several centimeters. The sensitive component of this construction is the dielectric tube which preferably is formed as a glass tube. What is disadvantageous about this construction is that during operation there oftentimes arises damage to the glass tube owing to the formation of fissures and puncturing of the glass tube so that such tube must be frequently replaced. The causes for such damage are attributable to irregular heating and local overheating of the glass tube which, as has been found, can be attributed to faulty cooling of the inner electrode and irregular discharges accompanied by intensive discharge currents which appear at certain locations. With a cooled inner electrode of the previously discussed type, the cooling agent practically only properly flows through the central region of the electrode space or compartment, whereas at the walls the flow velocity of the cooling agent is considerably smaller owing to friction and at the ends of the electrode tube there are present dead spaces in which the cooling agent stagnates and the heat-exchange effect only occurs via a relatively thick layer of cooling agent. As a result, stresses appear in the glass tube, which, especially when using the desirably thin-walled dielectric tubes, easily leads to the formation of fissures or cracks. As already mentioned, pronounced discharge currents appear at certain locations which are particularly brought about by virtue of the edges and sharp regions which are present at the electrodes, but also the presence of metallic components in the discharge compartment, such as for instance centering springs contribute to this effect.

SUMMARY OF THE INVENTION

Hence, from what has been stated above, it will be recognized that a real need still exists in the art for an improved construction of ozonizer which is not associated with the aforementioned drawbacks and limitations of the prior art constructions. Therefore, a primary object of the present invention is to provide a new and improved construction of ozonizer which effectively and reliably fulfills the existing need in the art and is not associated with the previously mentioned drawbacks of the state-of-the-art constructions.

Still a further significant object of the present invention relates to a novel construction of tubular-shaped ozonizer consisting of a minimum number of individual components which are economical to manufacture and which can be assembled in as short as possible time and wherein there is insured for a uniform heating of the dielectric tube as well as a uniform field intensity throughout the discharge compartment so that even when utilizing thin-wall dielectric tubes damage thereto can be extensively avoided.

Still a further significant object of the present invention is to provide a new and improved construction of tubular-shaped ozonizer which is relatively simple in design, economical to manufacture, requires minimum maintenance and servicing, and is not readily subject to malfunction or breakdown.

Now, in order to implement these and still further objects of the invention, which will become more readily apparent as the description proceeds, the invention contemplates sub-dividing the space between the inner and outer electrodes which is of substantially circular-shaped cross-sectional configuration, by means of the dielectric tube, into an external discharge compartment and an internal cooling compartment. The discharge compartment and the cooling compartment communicate by means of spaced hollow compartments provided at the closure caps with conduit connections of such closure caps for supplying the discharge compartment with air and the cooling compartment with a cooling fluid medium or coolant.

With the tubular-shaped ozonizer according to the invention the dielectric tube, in contrast to the known constructions, is cooled by a cooling fluid medium. The cooling compartment of substantially circular-shaped cross-shaped configuration advantageously possesses small depth and a smooth inner wall, and through which the cooling fluid medium can flow, for instance with a flow velocity of 1-3 meters per minute. Consequently, an extremely thin, slower moving fluid medium film forms at the dielectric tube and the inner electrode which, however, does not impair optimum cooling of the dielectric tube.

The dielectric tube can be longer than both electrode tubes and can be arranged in the closure caps in such a manner that the cooling compartment is longer than the discharge compartment and at both ends extends past the discharge compartment bounded throughout its length by the electrodes. Consequently, the extremely hot or high temperature discharges which, under circumstances, might arise at the electrode edges, only occur at cooled regions of the dielectric tube, no localized heating of such dielectric tube arising. Owing to these measures it is possible to employ as the dielectric tube a thin-walled glass tube, something which is advantageous for the economical operation of the ozonizer. When subjected to unfavorable operating conditions such thin-wall glass tube can become damaged, and thus, the cooling compartment of the ozonizer leaks, so that cooling fluid medium can flow into the discharge compartment. This would be particularly disadvantageous if, as is often usual, a number of ozonizers are assembled together at a single apparatus. In order to prevent interruption in the operation of the apparatus in the event of a leakage condition arising at one of the ozonizers, it is possible to arrange in the hollow compartment of each closure cap containing the air and ozone conduit connections and communicating the discharge compartment with such air- and ozone-conduit connections, a valve which can be actuated by the cooling fluid medium flowing into the hollow compartment. By means of such valve the associated conduit connection can be closed so that no cooling fluid medium can enter the air- and ozone-conduit.

BRIEF DESCRIPTION OF THE DRAWING

The invention will be better understood and objects other than those set forth above, will become apparent when consideration is given to the following detailed description thereof. Such description makes reference to the annexed drawing wherein:

FIG. 1 is an axial sectional view of a tubular-shaped ozonizer designed according to the teachings of this invention;

FIG. 2 is a cross-sectional view of a closure cap employed in the ozonizer of FIG. 1, taken substantially along the line A—A thereof; and FIG. 3 is a cross-sectional view of a portion of the closure cap used in the arrangement of FIG. 1, taken substantially along the line B—B thereof.

DETAILED DESCRIPTION OF THE PREFERRED EMBODIMENTS

Describing now the drawings, it is to be understood that the exemplary illustrated embodiment of ozonizer depicted in the drawing comprises a tubular-shaped inner electrode 1, a tubular-shaped outer electrode 2, a dielectric tube 3 formed of glass, and two similar closure caps 4a, 4b, in which the tubes are concentrically held in such a manner that a cooling compartment or chamber 5, for instance of 2 mm. radial dimension, is formed between the inner electrode 1 and the dielectric tube 3, and between the dielectric tube 3 and the outer electrode 2 there is present a discharge compartment 6 of, for instance, 1.8 mm. radial dimension.

The electrodes 1 and 2 are preferably smooth aluminum tubes, the surface of which can be eloxized. The dielectric tube 3 is in the form of a smooth, thin wall glass tube, the inner wall of which can be coated with a metallic layer 7. Both closure caps 4a and 4b are of identical construction and essentially consist of plastic, for instance PVC. As such, there will be generally considered hereinafter only the constructional details of one of these identical closure caps.

Each closure cap 4a and 4b possesses a cap body member 8 in the form of a preferably cylindrical plug member 8a having formed thereat a terminal or top flange 8b and containing a continuous metallic sleeve 9, for instance formed of brass. One end of the metallic sleeve 9 is located at the end plane of the plug 8a whereas the other end of this sleeve 9 has a certain portion or piece extending out of the terminal flange 8b and carries an external threading 10. The protruding end of each metallic sleeve 9 forms a respective conduit connection 11 for the infeed and outfeed of a cooling fluid medium or coolant, for instance cooling water. In order to guarantee for a positive support of the metallic sleeve 9 at the associated cap body 8, a metallic ring disc 12 is advantageously cast into the terminal or top flange 8b. An annular or ring-shaped shoulder 13 formed at the sleeve member 9 bears against this ring-shaped disc 12. The terminal or end flange 8b of each cap body member 8 possesses the form of a substantially circular disc having laterally protruding tabs or flaps carrying a nipple serving as the conduit connection 14 for the delivery of air or the withdrawal of ozonized air.

A centering sleeve 15 is mounted at the plug 8a of each cap body 8, this centering sleeve 15 being longer than the plug 8a and the end thereof which protrudes past the plug being closed by a floor or bottom 15a in order to form a hollow compartment 16 at the plug end. The metallic sleeve 9 merges with this hollow compartment 16 so that the hollow compartment 16 is in flow communication with the conduit connection 11. The centering sleeve member 15 will be seen to be equipped at the height of the plane containing the end of the plug 8a with four radial openings 17, as such can be best recognized by referring to FIG. 3. A number of annularly extending sealing ribs 18, wherein the illustrated embodiment two such annularly extending sealing ribs are shown, are provided at the centering sleeve 15 between the radial openings 17 and the floor or bottom 15a, the diameter of such sealing ribs 18 being only slightly greater than the internal diameter of the inner electrode 1, so that when the inner electrode 1 is pushed onto the sealing ribs 18 the inner compartment or space of such inner electrode 1 is closed and completely sealed. In order to limit the insertion depth, the centering sleeve 15 advantageously possesses a shoulder 19 at the region of the radial openings 17, the inner electrode 1 bearing against such shoulder 19 when it is mounted.

The portion of the centering sleeve 15 which extends from the radial openings 17 towards its open end likewise carries a number, for instance four sealing ribs 20. These sealing ribs 20 possess a diameter which is slightly greater than the inner diameter of the dielectric tube 3. The free edge of the centering sleeve 15 is constructed in the form of flange 21 possessing a shoulder 21a, so that the dielectric tube 3 which is pushed up to the shoulder 21a on the sealing ribs 20 is afforded a firm and fixed seat. The cooling compartment or chamber 5 which is formed between the inner electrode 1 and the dielectric tube 3 communicates via the openings 17 at the centering sleeve 15 with the hollow compartment 16 and via the metallic sleeve 9 with the conduit connection 11 and cooling water passes through such cooling compartment when the cooling system is connected. Further, by means of the water bridge at the openings 17 the inner electrode 1 is electrically coupled with the metallic sleeve member 9 which can be connected to one pole of a high-voltage source, so that the cooling water located in the cooling compartment 5 can be considered as one electrode of the ozonizer. The four sealing ribs 20 and the shoulder 21a 21a form an insulation path of sufficient length to prevent breakdown or flash overvoltages to the outer electrode. The centering sleeve 15 is preferably fabricated from a somewhat softer plastic, so that only slight radial forces act upon the dielectric tube and the inner electrode yet nonetheless there is obtained a satisfactory sealing action.

The closure cap jackets 22 serve for supporting, centering and spacing the outer electrode 2, each jacket 22 advantageously being formed for reasons of economy as an individual plastic component and then being fixedly connected with the terminal or end flange 8b of the associated cap body member 8, for instance by being adhesively bonded in a groove, as shown. As best seen by referring to FIG. 2, the cap jacket 22 encloses two compartments 23 and 24 of substantially circular-shaped cross-sectional configuration. The large central compartment 23 which is coaxial to the axis of the metallic sleeve member 9 is open and possesses a diameter which is the same size as the internal diameter of the outer electrode 2. The small cylindrical compartment 24 situated adjacent the large compartment 23 is coaxially arranged with regard to the throughflow opening 25 of the conduit connection 14 of the cap body member 8. The diameter of compartment 24 is somewhat greater than that of the throughflow opening 25 and is closed at its other end, however is in lateral communication with the large compartment 23. The cap jacket 22 furthermore possesses a thickened edge or marginal portion 26, at the inside of which there is formed an annular shoulder 27 serving as a stop or impact means for the outer electrode 2. Furthermore, the thickened marginal edge 26 contains a ring-shaped or annular groove in which there is inserted a sealing O-ring 28 serving as the seal for the outer electrode 2.

When the components are assembled together the discharge compartment 6 between the dielectric tube 3 and the outer electrode 2 communicates via the hollow spaces or compartments 23 and 24 with the conduit connection 14. The smaller hollow compartment or space 24 formed at the cap jacket 22 of each closure cap 4a and 4b serves to receive a respective safety valve embodying a respective valve body 29a and 29b, which in the illustrated embodiment comprises a cylindrical hollow body formed of plastic which is open at one end and possessing a rather massive conical tip at the closed end, as shown. Each valve body 29a and 29b is mounted so as to be easily displaceable within the associated small hollow compartment 24 and is guided by the compartment wall such that by means of each such valve body the throughflow opening 25 of the associated conduit connection 14 can be closed, the conical tip bringing about an exact centering of the relevant valve body 29a and 29b during its closing movement. With the ozonizer located in a vertical or upright position the valve body 29a of the upper closure cap member 4a bears against the floor or bottom of the small hollow compartment 24, which floor is formed by the thickened marginal edge 26 of the cap jacket 22, and the associated conduit connection 14 is open. In case of the valve body 29b of the lower closure cap member 4b the hollow compartment thereof is filled by a circular rod 29c formed of metal or plastic, and the valve body 29b bears against the throughflow opening 25 of the associated conduit connection 14, so that such is closed. Air at a certain slight overpressure is delivered to the ozonizer via the conduit connection 14 of the lower closure cap 4b. As a result, the valve body 29b is raised and the throughflow opening 25 is freed. The ozonized air flows away via the open conduit connection 14 of the upper cap member 4a. If per chance a dielectric tube which has a local curved or irregular region at a given location or is otherwise associated with a material defect is mounted at the ozonizer, then, during operation fissures or small holes can form and through which the cooling fluid medium can penetrate into the discharge compartment 6, so that a short-circuit condition arises which, however, can be easily rendered innocuous by electrical fuses.

The cooling fluid medium which infiltrates into the discharge compartment 6 then initially arrives at the valve compartment 24 of the lower cap member 4b, the valve body 29b serving as a check or return flow valve closing the conduit connection 14 when the pressure of the fluid medium is greater than the pressure of the inflowing air, so that no cooling fluid medium can arrive at the air conduit system of the installation. Then if the cooling fluid medium rises further in the discharge compartment 6 and if it arrives at the valve compartment 24 of the upper closure cap 4a, the conduit connection 14 of the closure cap 4a will also be closed by the valve body 29a which provides a valve float, and also here no fluid can penetrate into the ozone conduit system of the installation. The damaged ozonizer can then be easily removed from the installation. In order to exchange the dielectric tube it is only necessary to remove the closure caps from the electrode tubes, and in this regard it should be recognized that no tools are necessary.

At this point it is to be mentioned that it would be possible to mount a number of such ozonizers in a housing or frame, generally indicated at 30, adjacent one another and also to arrange a number of such frames in tandem or behind one another. The frames can be assembled from angle-shaped rods, for instance formed of aluminum, the upper and lower frame portions 30a and 30b advantageously being provided with slots for receiving the sleeve ends extending out of the closure caps, and the ozonizer tubes can be held at the frames 30 by means of threaded nut members 31 threaded onto the external threading 10 of the sleeves 9, as such has been best depicted in FIG. 1.

As should be readily apparent from the previously discussed exemplary embodiment of ozonizer designed according to the concepts of this development such need only be formed of a few components which are relatively inexpensive to manufacture. The closure caps can be injection molded parts formed of, for instance, PVC. A conventional glass tube can be employed as the dielectric tube, which glass tube is then cut to desired length but otherwise is not further machined or processed, with the exception of providing a possible metal coating at the inner wall. None of the components of the ozonizer need be formed of stainless or corrosion-resistant steel.

A further advantage of the inventive construction resides in the simple assembly and disassembly of the ozonizer, taking place by merely pushing together and again withdrawing, as the case may be, these components, no tools being required. This is a feature which is particularly attractive and advantageous during servicing and maintenance work, permitting such to be carried out quickly and without any great expenditure.

The ozonizers of the invention are also particularly suitable for being assembled together so as to form different size ozonizer installations, the assembly can be undertaken according to the module or building-block system and wherein the entire installation can be operated either with vacuum or at desired pressure, and specifically without any special measures having to be undertaken. For instance, 90 ozonizers can be assembled together into a structural unit in a steel cabinet, wherein one such structural unit can deliver approximately 700 grams ozonized air per hour with a concentration of 15 grams ozone per cubic meter. Above 100 grams ozone per hour and per ozonizer it is worthwhile to use polyphase transformers. A random or optional number of such structural units can be then assembled together into an installation and driven with a high-voltage of relatively high-frequency.

While there is shown and described present preferred embodiments of the invention, it is to be distinctly understood that the invention is not limited thereto but may be otherwise variously embodied and practiced within the scope of the following claims. Accordingly, what is claimed is:

1. A tubular-shaped ozonizer comprising an inner substantially tubular-shaped electrode and an outer substantially tubular-shaped electrode defining therebetween a compartment possessing in cross-section a substantially circular-shaped configuration, a dielectric tube substantially concentrically arranged between said inner electrode and said outer electrode in said circular-shaped compartment, electrically insulating closure cap members mounted at the ends of the tubular-shaped electrodes and said dielectric tube for supporting and maintaining in spaced relationship from one another said tubular-shaped electrodes and said dielectric tube, said dielectric tube subdividing said circular-shaped compartment between the inner electrode and the outer electrode into an outer discharge compartment and an inner cooling compartment, said closure caps being provided with conduit connections for supplying the discharge compartment with air and the cooling compartment with a cooling fluid medium, said closure caps being provided with hollow compartments which are separated from one another, and wherein said discharge compartment and said cooling compartment are selectively in flow communication with said conduit connections via said separated hollow compartments.

2. The ozonizer defined in claim 1, wherein said inner electrode and said outer electrode possess approximately the same length, and wherein said dielectric tube protrudes at the region of said closure caps at both of its ends past the approximately equal length inner and outer electrodes, and wherein said cooling compartment extends past the ends of said inner electrode in order to also cool the regions of said dielectric tube extending out of said discharge compartment, the length of which discharge compartment is determined by said inner and outer electrodes.

3. The ozonizer as defined in claim 2, further including electrically insulating, radially extending sealing ribs, provided for said closure caps for supporting the ends of said dielectric tubes in order to lengthen the insulation path from the edges of the inner electrode to the edges of the outer electrode.

4. The ozonizer as defined in claim 1, further including a respective safety valve provided for that one of said hollow compartments of each of both closure caps which communicates the discharge compartment with its associated conduit connection, each safety valve containing a valve body, and wherein each conduit connection can be closed by the associated valve body when cooling fluid medium penetrates into said one hollow compartment.

5. The ozonizer as defined in claim 3, further including a respective centering sleeve member for each of both closure caps for centering and spacing the inner electrode and said dielectric tube, a cap jacket for each closure cap surrounding the associated centering sleeve at a radial spacing for centering and spacedly retaining the outer electrode, said tubular-shaped inner electrode being sealed at each end by a front portion of the associated centering sleeve, each closure cap having at least two conduit connections, one of said conduit connections of one of said closure caps serving for the infeed of cooling fluid medium and one of the conduit connections of the other closure cap for the outflow of said cooling fluid medium, the remaining conduit connections of said closure caps serving for the inflow of air to the discharge compartment and the outflow of ozone from the ozonizer, each centering sleeve being provided with radial openings, one of the hollow compartments of each closure cap being substantially centrally disposed thereat, said cooling compartment at the region of each closure cap being in flow communication via said radial openings and its associated centrally disposed hollow compartment with its associated conduit connection for the cooling fluid medium, the other of said hollow compartments of each closure cap defining a substantially ring-shaped hollow compartment disposed between said dielectric tube and said cap jacket, said discharge compartment being in flow communication with an associated conduit connection for said air or ozone of the respective closure cap via such associated ring-shaped hollow compartment.

6. The ozonizer as defined in claim 5, wherein said centering sleeve of each closure cap embodies a metallic sleeve member having an end protruding out of the associated closure cap and forming the conduit connection for the cooling fluid medium and which can be connected to a high voltage-supply current circuit of the ozonizer, and wherein said inner electrode is only electrically connected via the cooling fluid medium with the associated metallic sleeve member.

7. The ozonizer as defined in claim 5, wherein said cap jacket is provided with a lateral hollow compartment for receiving the valve body, said last-mentioned hollow compartment being in flow communication with said ring-shaped hollow compartment of the associated closure cap and opening into the conduit connection for the discharge compartment, and wherein said valve body of the closure cap member defining the upper closure cap when the ozonizer is in an upright position is constructed in the form of a float member in order to be raised by the cooling fluid medium penetrating into the lateral hollow compartment so as to close the associated conduit connection, and wherein the valve body of the lower closure cap member is constructed as a check valve so that when air is delivered at an overpressure to the conduit connection for the discharge compartment this conduit connection is freed whereas such conduit connection is closed by such valve body when the pressure of the cooling fluid medium penetrating into the lateral hollow compartment exceeds the air pressure.

8. The ozonizer as defined in claim 7, wherein said lateral hollow compartment defines a substantially cylindrical hollow compartment and the conduit connection for the discharge compartment is arranged coaxially with regard to said cylindrical hollow compartment, each valve body possessing a cylindrical shaft which is guided at the lateral hollow compartment and has a conical tip which extends into the opening of the conduit connection, and wherein said shaft of the valve body of the upper closure cap is hollow.

References Cited
UNITED STATES PATENTS

| | | | |
|---|---|---|---|
| 1,454,219 | 5/1923 | Goedicke | 204—320 |
| 1,834,705 | 12/1931 | Hartman | 204—321 |
| 2,010,081 | 8/1935 | Hartman | 204—321 |
| 2,607,726 | 8/1952 | Chadwick | 204—321 |

JOHN H. MACK, Primary Examiner

T. TUFARIELLO, Assistant Examiner

U.S. Cl. X.R.

204—320